(12) United States Patent
Donohoe

(10) Patent No.: US 8,165,868 B2
(45) Date of Patent: Apr. 24, 2012

(54) SPEECH TRANSLATING SYSTEM

(76) Inventor: James Donohoe, Trevose, PA (US)

( * ) Notice: Subject to any disclaimer, the term of this patent is extended or adjusted under 35 U.S.C. 154(b) by 1011 days.

(21) Appl. No.: 11/955,812

(22) Filed: Dec. 13, 2007

(65) Prior Publication Data

US 2009/0157410 A1  Jun. 18, 2009

(51) Int. Cl.
*G06F 17/28* (2006.01)
(52) U.S. Cl. .................................. 704/7; 704/2
(58) Field of Classification Search ........................ None
See application file for complete search history.

(56) References Cited

U.S. PATENT DOCUMENTS 6,275,789 B1 * 8/2001 Moser et al. ...................... 704/7
2003/0149557 A1 * 8/2003 Cox et al. ......................... 704/2

* cited by examiner

*Primary Examiner* — Justin Rider
(74) *Attorney, Agent, or Firm* — Michael Ries

(57) ABSTRACT

Disclosed is a speech translating system for translating speech from a first language to a language selected from a set of second languages. The system includes an input unit, a processor, and an output unit. The input unit is capable of receiving the speech in the first language. The processor is operatively coupled to the input unit and is capable of converting the speech in the first language to the speech in the selected language. The output unit is operatively coupled to the processor. The output unit is capable of outputting the speech in the selected language.

12 Claims, 3 Drawing Sheets

SPEECH TRANSLATING SYSTEM

FIELD OF THE INVENTION

The present invention relates generally to a speech translating system, and more particularly, to a speech translating system capable of translating a speech in one language to a speech in another desired language.

BACKGROUND OF THE INVENTION

In recent times, the number of people traveling to various countries for the purpose of pleasure and/or business has increased. People in different parts of the world generally communicate in different languages. During such travels, a traveler may face communication problems if he/she is not conversant in a language spoken in the part of the world he/she is visiting.

In order to overcome such communication problems, a traveler may use a human interpreter, a language translation book (for example, foreign language phrase books), or a combination of similar tools. However, human interpreters are usually very costly; while the translation books are cumbersome and do not allow for speedy translation.

Various software packages are also available for assisting travelers with translation of foreign languages. Such software packages may be installed in a computer for translating a text from one language to a text in a desired foreign language. Usually, such software packages provide translation of the text only one word at a time. Also, while communicating, a user may not have enough time to enter all the text quickly and thereafter read the translation of the text, thereby slowing down the process of translation.

Accordingly, there is a need for a system for translation from one language to another desired language in a fast, easy, reliable, and cost effective manner. Moreover, there is a need for a translating system that may substitute interpreters and language translation books.

SUMMARY OF THE INVENTION

In view of the foregoing disadvantages inherent in the prior art, the general purpose of the present invention is to provide a speech translation system configured to include all the advantages of the prior art, and to overcome the drawbacks inherent therein.

Therefore, an object of the present invention is to provide a speech translating system that is capable of providing a translation of speech in one language to another language, thereby replacing interpreters and language translation books.

Another object of the present invention to provide a speech translating system that may be handy and comfortable to use.

Still another object of the present invention is to provide a speech translating system that may enable a smooth communication between users.

In light of the above objects, in one aspect, the present invention provides a speech translating system. The speech translating system is capable of translating a speech in a first language to a language selected from a set of second languages. The speech translating system includes an input unit, a processor operatively coupled to the input unit, and an output unit operatively coupled to the processor. In operation, the input unit receives the speech in the first language. Thereafter, the processor translates the speech in the first language to the speech in the language selected from the set of second languages. Subsequently, the speech in the selected language may be output from the output unit.

In another aspect, the present invention provides a speech translating system for use in a portable electronic device, thereby making the speech translating system handy and comfortable to use.

These together with other aspects of the present invention, along with the various features of novelty that characterize the present invention, are pointed out with particularity in the claims annexed hereto and form a part of the present invention. For a better understanding of the present invention, its operating advantages, and the specific objects attained by its uses, reference should be made to the accompanying drawings and descriptive matter in which there are illustrated exemplary embodiments of the present invention.

BRIEF DESCRIPTION OF THE DRAWINGS

The advantages and features of the present invention will become better understood with reference to the following detailed description and claims taken in conjunction with the accompanying drawings, wherein like elements are identified with like symbols, and in which:

Like reference numerals refer to like parts throughout the description of several views of the drawings.

DETAILED DESCRIPTION OF THE INVENTION

The exemplary embodiments described herein detail for illustrative purposes and are subject to many variations in structure and design. It should be emphasized, however, that the present invention is not limited to a particular speech translating system, as shown and described. It is understood that various omissions and substitutions of equivalents are contemplated as circumstances may suggest or render expedient, but these are intended to cover the application or implementation without departing from the spirit or scope of the claims of the present invention. Also, it is to be understood that the phraseology and terminology used herein is for the purpose of description and should not be regarded as limiting. The terms "a" and "an" herein do not denote a limitation of quantity, but rather denote the presence of at least one of the referenced item.

The present invention discloses a speech translating system. The speech translating system enables translating a speech from one language to a speech in another language. More specifically, the speech translating system is capable of interpreting meaning of a word or words in one language and thereafter providing an equivalent word or phrase in another language. The speech translating system enables bridging a communication gap between people. Travelers may use the speech translating system as an effective tool for communicating in different languages.

Figure 1:
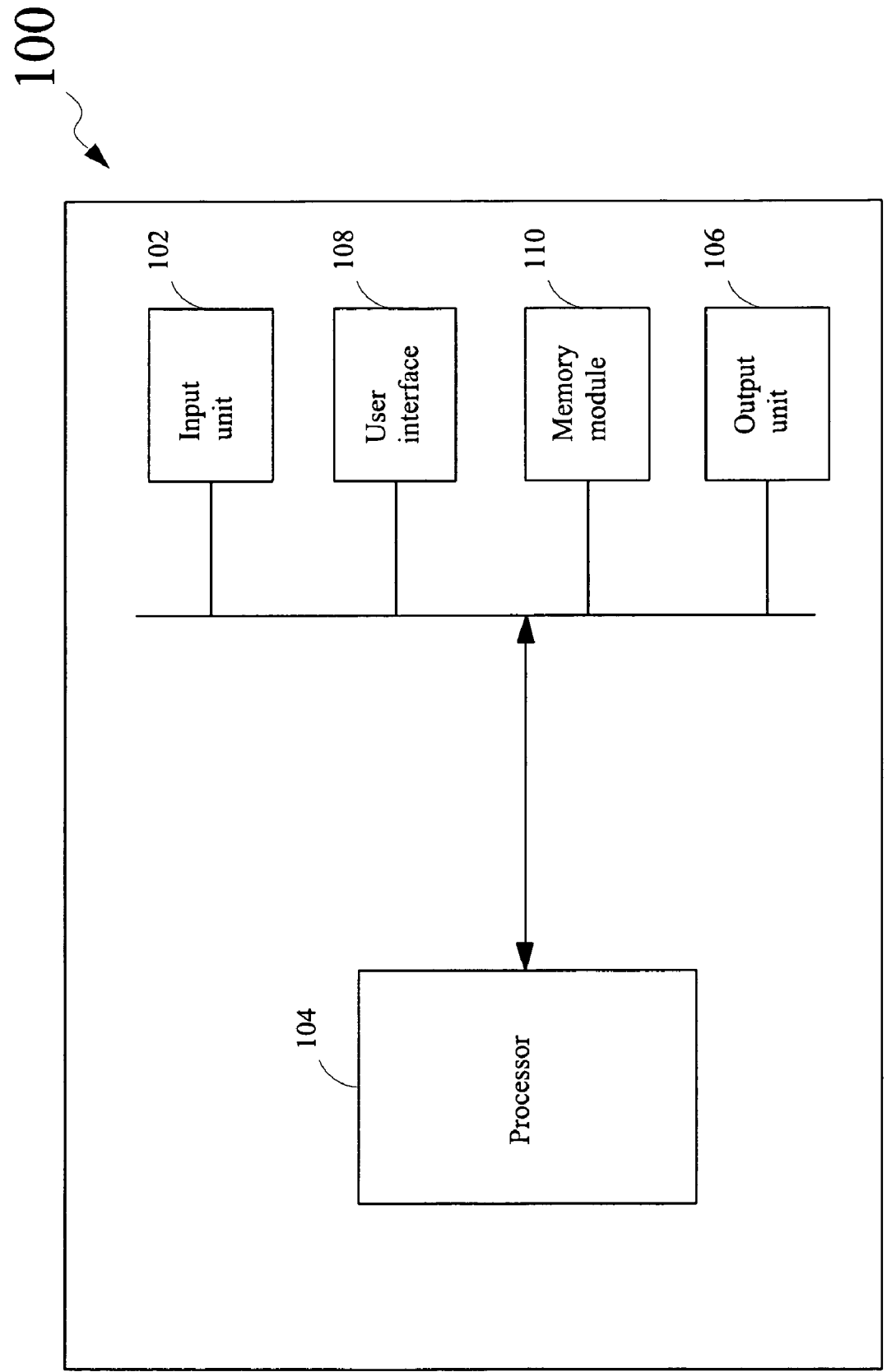
FIG. 1 is a block diagram of a speech translating system, according to an embodiment of the present invention.

Referring to FIG. 1, a block diagram of a speech translating system 100, hereinafter referred to as system 100, is illustrated. The system 100 may be used for translating a speech in a first language to a language selected from a set of second languages. The system 100 includes an input unit 102, a processor 104, and an output unit 106. The input unit 102 is capable of receiving the speech in the first language. In one embodiment of the present invention, the input unit 102 is a microphone. The input unit 102 may be operatively coupled to the processor 104. The processor 104 is capable of translating the speech received in the first language to a speech in the second language. The speech in the selected language, hereinafter referred to as the translated speech, may be delivered to a user by means of the output unit 106. The output unit 106 may be at least one of a headphone, a built-in speaker, and an external speaker. More specifically, when it is desired to make the translated speech audible to other users, a speaker may be utilized as the output unit 106. However, when the user wants to avoid any other person from listening to the translated speech, the user may utilize a headphone as the output unit 106 for listening to the translated speech in the selected language.

The speech translation system 100 further includes a user interface 108 for enabling the user to select a language from the set of languages. The user interface 108 may be operatively coupled to the processor 104. The user interface 108 may be in the form of push buttons. Alternatively, the user interface 108 may be in form of a touch-screen system or voice-recognition system. As described herein, when the user wishes to translate a speech from one language, for example, English, to another language, for example, Mandarin Chinese; the user may press a button, and, accordingly, the processor 104 may translate the speech in English to the speech in Mandarin Chinese.

In one embodiment of the present invention, the processor 104 is enabled automatically for selecting a language of the set of languages. For example, the processor 104 may select a language based on a geographical location of the system 100. More specifically, the processor 104 may be configured to determine language characteristics of a geographical location. Accordingly, when the user leaves one geographical location and enters a different geographical location following a different language, the processor 104 may select a language followed at the different geographical location. For example, the user may set preferences to translate speech in English to speech in French when the user is using the system 100 in France. However, when the user leaves France and enters Japan, the processor 104 may automatically change the selected language to Japanese.

In one embodiment, the processor 104 is capable of selecting at least one of a male voice and a female voice for outputting the translated speech, based on the received input from a user. For example, the user may wish to receive the translated speech in a male voice. Accordingly, the user may select an option using the user interface 108, to deliver the translated speech in the male voice. Based on the selected option, the processor 104 may output the translated speech in the male voice.

The system 100 may further include a memory module 110 for storing the set of second languages and the first language. As disclosed herein, storing a language refers to storing vocabulary of the language, grammatical rules of the language, formal and informal way of addressing in the language, ordering of words in the language, and similar language rules for appropriate translation. Also, such storing of a language ensures that the language is listed as an option that is selectable by a user.

Moreover, the memory module 110 is capable of storing an updated vocabulary of a language, based on a user input.

Figure 2A:
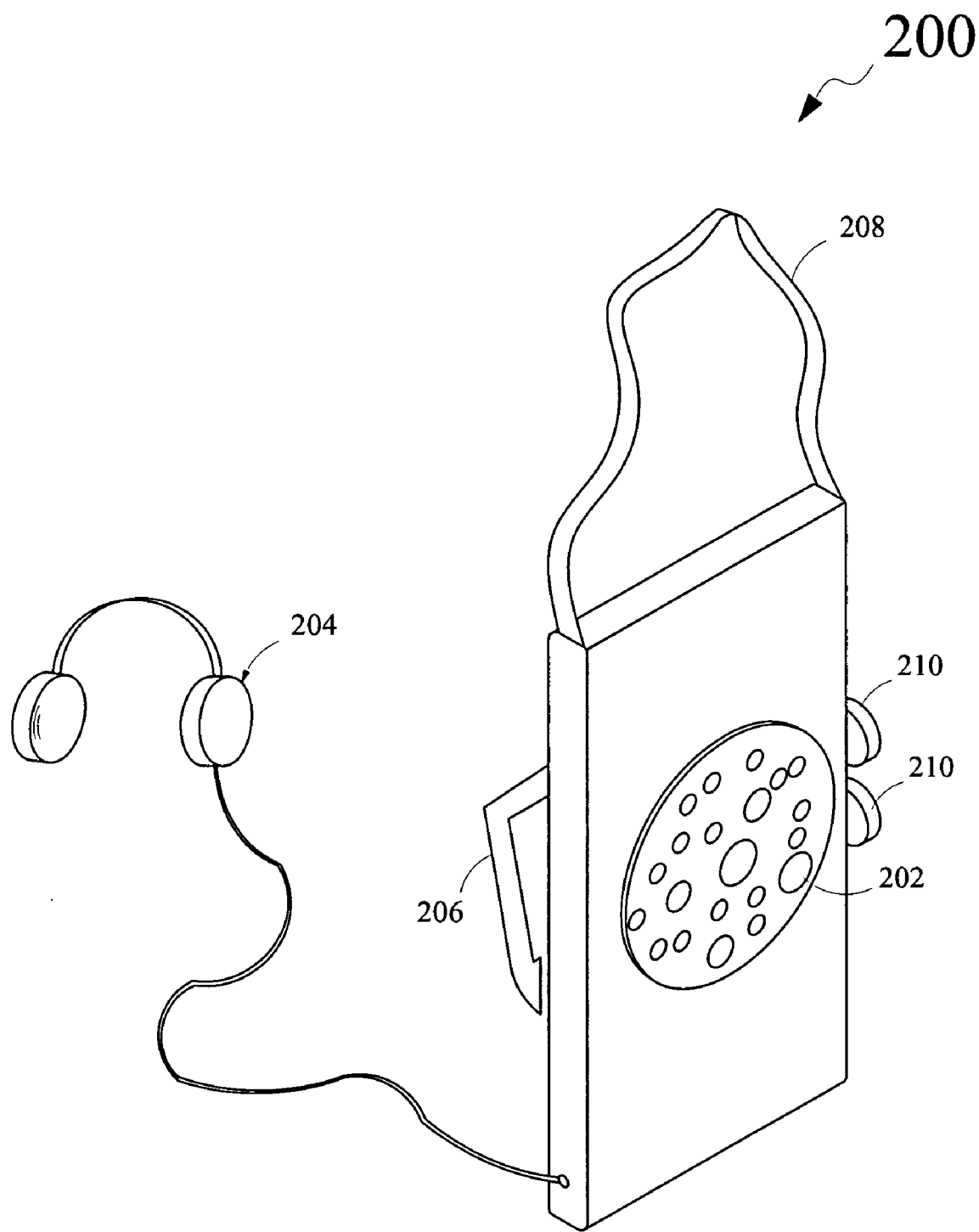
FIG. 2A illustrates a portable electronic device incorporating the speech translating system illustrated in FIG. 1.

With reference to FIG. 2A, the speech translating system 100 described in FIG. 1 may be incorporated in a portable electronic device, for example, portable electronic device 200, hereinafter referred to as the device 200. The device 200 may include an input unit (not shown) similar to the input unit 102 (FIG. 1). In one embodiment, the input unit is a microphone. The microphone may receive an audio input from the user. More specifically, a speech of the user, for example a phrase or a sentence, may be the input to the device 200 through the microphone. Preferably, the microphone is incorporated within the device 200. Alternatively, the device 200 may include a port for receiving an external connection from a microphone. The audio input may be processed in the device 200 by a processor (not shown). More specifically, the processor may translate the speech in one language to the speech in another language.

Further, the device 200 may include an output unit, for example, a speaker. The speaker may be a built-in speaker 202 or an external speaker. The built-in speaker 202 enables the user and other listeners to listen to the translated speech.

In some cases, the user may not desire to share the translated speech with other listeners. Accordingly, the user may utilize a headphone 204 (herein serving as the output unit) for listening to the translated speech. The headphone 204 may have a wired or a wireless connection with a body of the device 200. For example, as illustrated in FIG. 2A, the headphone 204 is connected to the body of the device 200 through a wired connection. More specifically, the body of the device 200 may include a receiving port (not shown) for receiving an external connection from the headphone 204. The headphone 204 may be used by the user, thereby preventing any other listener to listen to the translated speech.

The device 200 may further include a clip 206. The clip enables the user to engage the device 200 at a convenient location, for example, to a waist belt of the user. Moreover, the device 200 may include a strap 208 for hanging the device 200. For example, while traveling, the user may wish to hang the device 200 around his/her neck or shoulder, thereby facilitating easy transportation of the device 200.

It should be understood that the device 200 includes various user interface capabilities of the system 100 disclosed and described in conjunction with FIG. 1. For example, the device 200 may include one or more user interface buttons 210 for performing one of the following functions: selecting a language from a set of languages; adjusting the volume of the translated speech output from the speakers; selecting one of a male voice and a female voice; and similar functions to serve as an effective translation tool.

Figure 2B:
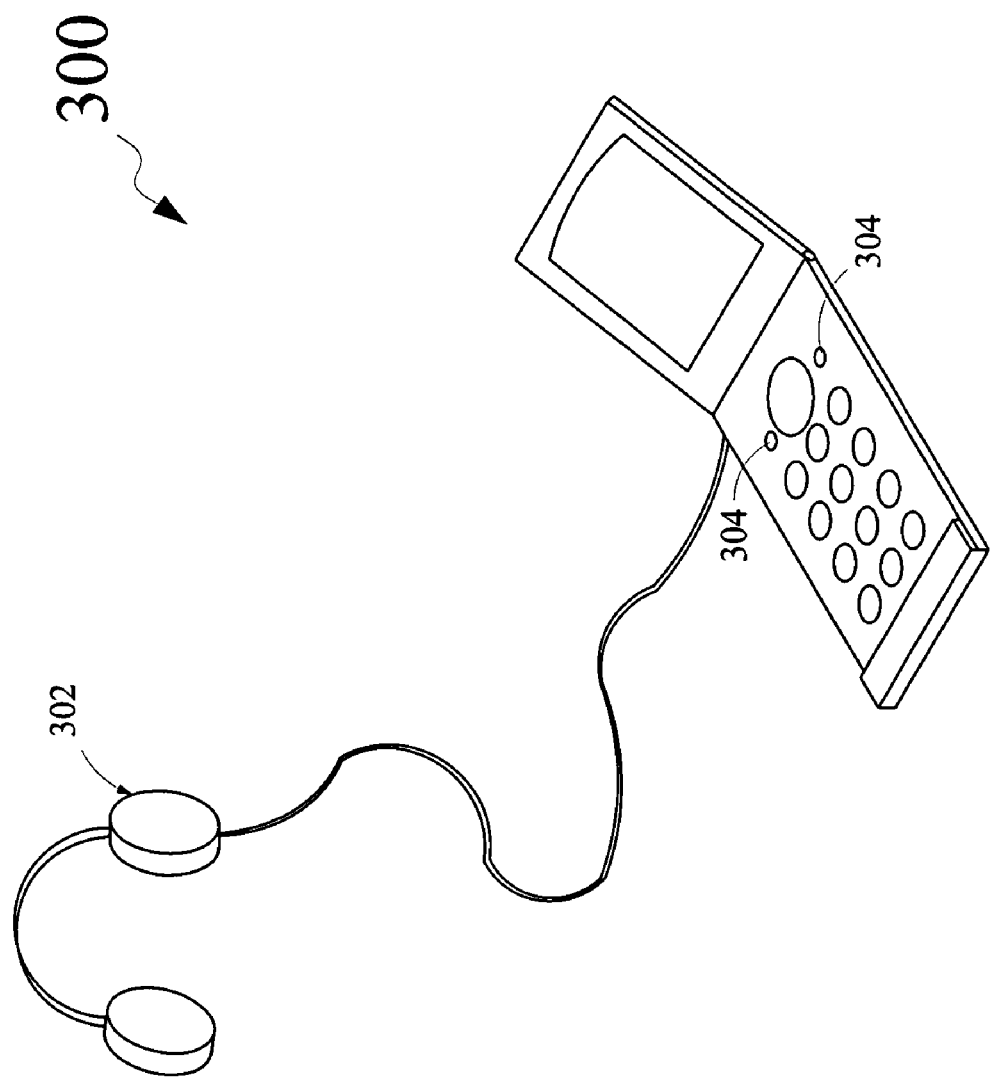
FIG. 2B illustrates a cellular phone incorporating the speech translating system illustrated in FIG. 1.

In one embodiment, the speech translating system of FIG. 1 is incorporated in a communication device. Suitable communication devices include, but are not limited to, cellular phones, personal digital assistants (PDAs), and laptops. More specifically, referring to FIG. 2B, a cellular phone 300 incorporating the system 100, is shown. For the purpose of this description, all the components of the system 100 are not shown in FIG. 2B. However, it should be understood that the cellular phone 300 includes all the features of the system 100, as illustrated and described in conjunction with FIG. 1. For example, the cellular phone 300 is not shown to include a processor and a memory module in FIG. 2B. However, it should be obvious to a person skilled in the art that the processor and the memory module are configured within the cellular phone 300, and are not visible externally.

The cellular phone 300 may include an input unit, for example, a microphone (not shown); an output unit, for example, a headphone 302; and a user interface, for example, a plurality of user interface buttons 304. The user interface may enable the user to select a first language and a language from a set of second languages. Alternatively, or in addition, the user interface may be in form of a touch-screen system or a voice-recognition system. Moreover, the cellular phone 300 may include features for carrying on the user interface functions using a remote control.

In use, the user may speak in the first language through the microphone of the cellular phone 300. Based on the speech input by the user in the first language, the cellular phone 300 may translate the speech in first language to a speech in the selected language. The translated speech in the selected language may be available to the user and other listeners by means of speakers (not shown). However, when it is desired to avoid other listeners from listening to the translated speech, the user may utilize the headphone 302 for receiving the translated speech.

As described above, the present invention discloses a system for translating a speech in one language to a speech in another desired language. Accordingly, the system removes language barrier that otherwise restrict communication between people speaking different languages. The system may be incorporated in a portable electronic device that may be manually or automatically activated to select another language in which the translation is desired. Moreover, the present invention provides a user with an option of utilizing a headphone or a speaker of the portable electronic device to listen to the translated speech.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The embodiments were chosen and described in order to best explain the principles of the present invention and its practical application, and to thereby enable others skilled in the art to best utilize the present invention and various embodiments with various modifications as are suited to the particular use contemplated. It is understood that various omissions and substitutions of equivalents are contemplated as circumstances may suggest or render expedient, but these are intended to cover the application or implementation without departing from the spirit or scope of the claims of the present invention.

What is claimed is:

1. A speech translating system, comprising:
   an input unit to receive a speech in a first language;
   a processor operatively coupled to the input unit, the processor capable of translating the speech in the first language to a speech in a language selected from a set of second languages that is enabled to select the selected language from the set of second languages based upon a determination of a geographic location of the system and that is capable of selecting one of a male voice and a female voice to output the speech in the selected language of the set of second languages, based on the received input from a user;
   an output unit operatively coupled to the processor, the output unit capable of outputting the speech in the selected language of the set of second languages;
   a user interface operatively coupled to the processor, the user interface capable of enabling a user to select the language from the set of second languages; and
   a memory module operatively coupled to the processor, wherein the memory module is capable of storing the set of second languages and the first language and stores said second set of languages and said first language that refers to storing vocabulary of said languages, a plurality of grammatical rules of said languages, a plurality of formal and informal rules of addressing said languages and an ordering of a plurality of words of said languages.

2. The system of claim 1, wherein the output unit is a set of headphones.

3. The system of claim 2, wherein said set of headphones has a wireless connection with said system.

4. The system of claim 1, wherein said output unit is a built-in speaker.

5. The system of claim 1, wherein said output unit is an external speaker.

6. The system of claim 1, wherein said user interface is a plurality of buttons.

7. The system of claim 1, wherein said user interface is a touch-screen system.

8. The system of claim 1, wherein said user interface is a voice recognition system.

9. The system of claim 1, wherein said memory module is capable of storing an updated vocabulary of said second set of languages and said first language.

10. The system according to claim 1, wherein said system is incorporated into a communication device.

11. The system according to claim 10, wherein said communication device is a cellular phone.

12. The system according to claim 1, wherein said system is a portable system.

* * * * *